United States Patent Office 3,123,649
Patented Mar. 3, 1964

3,123,649
PREPARATION OF 1,2,4-TRIPHENYL-NAPHTHALENE
Edward J. McNelis, Wallingford, Pa., assignor to Sun Oil Company, Philadelphia, Pa., a corporation of New Jersey
No Drawing. Filed Sept. 24, 1962, Ser. No. 225,842
4 Claims. (Cl. 260—668)

This invention relates to a method for preparing 1,2,4-triphenylnaphthalene by the pyrolysis of tetraphenylcyclopentadienone (tetracyclone).

Triphenylnaphthalenes, particularly 1,2,4 - triphenylnaphthalene, are of particular value as insecticides, fungicides, and pesticides.

According to the present invention, 1,2,4-triphenylnaphthalene is prepared by heating tetracyclone to a temperature in the range of 350° C. to 450° C., preferably 395° C. to 435° C. The following reaction takes place to a substantial extent:

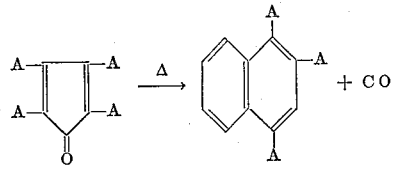

In the reaction, A represent a phenyl radical.

The pyrolysis preferably is carried out at about atmospheric pressure and in a manner to exclude air or moisture from the reaction mass. The carbon monoxide produced in the reaction may be vented from the reaction vessel or it may be contained therein by the use of suitable pressure equipment. The pyrolysis is most preferably conducted in an inert atmosphere such as nitrogen.

The time required to pyrolyze the tetracyclone to form the desired 1,2,4-triphenylnaphthalene is of relatively short duration. It has been found that the reaction is essentially complete in about 45 minutes. It has further been found that substantial amounts of the desired hydrocarbon product are formed in a period of time ranging between 5 minutes and 15 minutes. Even though the reaction is essentially complete in about 45 minutes, heating for extended periods of time, for example, up to about 10 hours or more, is not detrimental to the instant process.

While 1,2,4-triphenylnaphthalene is the primary product produced by the prolytic process of the instant invention, there is also produced some 2,3-diphenyl-1H-cyclopenta[1]phenanthren - 1 - one and tetraphenylcyclopentenone. These materials have the following structural formulas respectively:

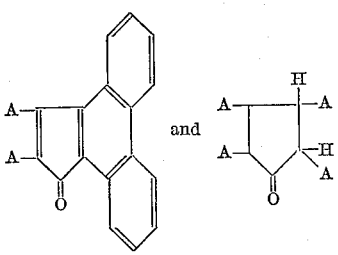

wherein A is a phenyl radical. The product mixture can be resolved by a chromatographic separation from an acid-washed column of alumina by first dissolving the products in a suitable solvent such as a 5:95 volume ratio of benzene and petroleum ether. The resulting solution is passed through a column of acid-washed alumina. The triphenyl naphthalene passes through the column with the solvent mixture and is recovered therefrom by removal of the solvents such as by evaporation. The triphenyl naphthalene so produced upon recrystallization from methanol is extremely pure, i.e. 99+%. The 2,3-diphenyl-1H-cyclopental[1]phenanthren-1-one is then eluted from the column by the use of a mixed solvent comprising benzene-petroleum ether in a volume ratio of 50:50. After evaporation of the eluting solvents the product is recovered. Similarly the tetraphenylcyclopentenone is recovered from the column of alumina by further elutriation with a mixed solvent comprising benzene-petroleum ether in a volume ratio of 75:25 and subsequent evaporation of the solvent.

The following example is intended as illustrative of the instant invention.

Example

Tetracyclone (6.342 grams) was heated in a nitrogen atmosphere between 395° C. and 435° C. for 10 minutes. After cooling to room temperature the reaction mass was dissolved in a mixed solvent comprising 300 ml. of a 5% benzene-95% petroleum ether. The resulting solution was charged to an acid-washed alumina column having a diameter of 2 cm. and a height of 40 cm. The hydrocarbon product passed through the column in the 5% benzene-95% petroleum ether mixed solvent. The solvents were evaporated and there were recovered 2.069 grams of a crystalline material which was identified as 1,2,4-triphenylnaphthalene by melting point (observed—159–160° C., reported—158–161° C.), by mass spectrum molecular weight determination (356) and by U.V. analysis. The U.V. analysis showed peaks at 246 m$\mu$ (48,600) and 303 m$\mu$ (13,500). The reported values for 1,2,4-triphenylnaphthalene are 246 m$\mu$ (49,000) and 303 m$\mu$ (13,000) (see JACS, 82, 3628). The yield of 1,2,4-triphenylnaphthalene represented a 35% yield of theory.

After elutriation with a mixed solvent comprising 750 ml. of benzene and 750 ml. of petroleum ether and evaporation of the solvents, there was separated and recovered 2,3-diphenyl-1H-cyclopenta[1]phenanthren-1-one. After a further elutriation with a mixed solvent comprising 750 ml. of benzene and 250 ml. of petroleum ether and evaporation of the solvents, there was separated and recovered tetraphenylcyclopentenone. The tetraphenylcyclopentenone was identified by I.R. and U.V. analysis and also by mass spectrum molecular weight determination (386) and melting point (160–161° C.). The 2,3 - diphenyl-1H-cyclopenta[1]phenanthren-1-one was identified by mass spectrum molecular weight determination (382), melting point (247–248° C.) and by elemental analysis. This material had a carbon content of 90.94%, a hydrocarbon content of 4.93%, and an oxygen content of 4.26%, compared with theoretical values of 91.07%, 4.74%, and 4.18% respectively.

It is thus apparent from the foregoing description and example that the instant process illustrates a facile preparation of 1,2,4-triphenylnaphthalene.

I claim:
1. Method of preparing 1,2,4-triphenylnaphthalene which comprises heating tetraphenylcyclopentadienone at a temperature ranging between 350° C. and 450° C. for at least 5 minutes and thereafter separating and recovering said triphenylnaphthalene.
2. Method in accordance with claim 1 wherein the temperature ranges between 395° C. and 435° C.
3. Method in accordance with claim 2 wherein the time of heating ranges between 5 minutes and 45 minutes.
4. Method in accordance with claim 1 wherein the time of heating ranges between 5 minutes and 45 minutes.

No references cited.